(12) United States Patent
Berke

(10) Patent No.: US 9,678,490 B2
(45) Date of Patent: Jun. 13, 2017

(54) SYSTEMS AND METHODS FOR TEMPERATURE-BASED PERFORMANCE OPTIMIZATION OF MEMORY DEVICES

(71) Applicant: Dell Products L.P., Round Rock, TX (US)

(72) Inventor: Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 429 days.

(21) Appl. No.: 14/312,196

(22) Filed: Jun. 23, 2014

(65) Prior Publication Data

US 2015/0373876 A1    Dec. 24, 2015

(51) Int. Cl.
*H05K 7/20* (2006.01)
*G05B 15/02* (2006.01)
*G05D 23/19* (2006.01)
*G06F 1/20* (2006.01)

(52) U.S. Cl.
CPC ......... *G05B 15/02* (2013.01); *G05D 23/1919* (2013.01); *G06F 1/206* (2013.01)

(58) Field of Classification Search
CPC ........... H05K 7/20209; H05K 7/20136; G05D 23/1917; G05B 15/02
See application file for complete search history.

(56) References Cited

U.S. PATENT DOCUMENTS

| | | | | |
|---|---|---|---|---|
| 2002/0030239 A1* | 3/2002 | Der Ropp | ............ | H01L 23/345 257/426 |
| 2012/0033503 A1* | 2/2012 | Kim | ...................... | G11C 16/16 365/185.33 |
| 2012/0279952 A1* | 11/2012 | Vanalli | .................... | G11C 11/00 219/209 |
| 2014/0240913 A1* | 8/2014 | Vyshetsky | ............... | G06F 1/206 361/679.31 |

* cited by examiner

*Primary Examiner* — Ryan Jarrett
(74) *Attorney, Agent, or Firm* — Jackson Walker L.L.P.

(57) ABSTRACT

In accordance with embodiments of the present disclosure, a memory system may include one or more memory modules and a memory controller communicatively coupled to one or more memory modules. The memory controller may be configured to determine a temperature associated with the memory system and determine if the temperature is below a minimum threshold temperature, wherein the minimum threshold temperature is a predetermined margin greater than a critical temperature below which one or more timing parameters of the memory system are of greater durations than they are when the temperature is above the critical temperature, and further wherein the predetermined margin is zero or greater. The memory controller may also be configured to initiate one or more remedial actions to increase the temperature above the minimum threshold temperature if the temperature is below the minimum threshold temperature.

18 Claims, 2 Drawing Sheets

SYSTEMS AND METHODS FOR TEMPERATURE-BASED PERFORMANCE OPTIMIZATION OF MEMORY DEVICES

TECHNICAL FIELD

The present disclosure relates in general to information handling systems, and more particularly to systems and methods for temperature-based performance optimization of memory devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use memories to store data, either temporarily in volatile memory or in a quasi-permanent basis in non-volatile memory. A type of memory often used is dynamic random access memory (DRAM). DRAM includes a number of memory cells each configured to store one bit of data. One crucial timing parameter of a DRAM is the write recovery parameter, which defines a minimum time required to ensure that a DRAM cell has been written to its full charge. As DRAM technology has scaled to smaller and smaller physical sizes, suppliers of DRAMs have indicated a desire to increase the write recovery parameters of their DRAMs, and have pursued relaxation of the write recovery parameter with the Joint Electron Device Engineering Council (JEDEC), the computing industry's memory standards-setting organization. Without this timing relaxation, the DRAM bit error rate due to write failures may become so high as to make DRAM chips non-manufacturable at an acceptable yield. Such increases in the write recovery parameters and other timing parameters of DRAM may significantly reduce bandwidth of memory devices.

In addition, in many DRAMs, the write time of a memory cell may increase as the ambient temperature of the memory cell falls, further degrading memory performance as temperature decreases. In fact, many in the relevant industry have proposed that for future memory implementations, DRAM timing parameters such as the write recovery parameter be a function of operating temperature. For example, in future DRAM devices, a write recovery parameter may have a value of 60 nanoseconds for temperatures below 45 degrees Celsius and a value of 30 nanoseconds for temperatures above 45 degrees Celsius. Such DRAM devices may also be enabled such that a memory controller of a DRAM device may be notified of such changes in temperature and modify timing parameters in accordance with such temperature.

Because an increase in write recovery time increases overall DRAM write latency and read-after-write latency to the same DRAM rank, maximum memory bandwidth may decrease due to a drop in temperature. Thus, with the industry-proposed changes to move towards temperature-based timing parameters, when a temperature falls below a certain level, write latency may triple and write bandwidth would fall by up to two-thirds when writes are issued to the same DRAM rank and bank. Another disadvantage is that variable memory latency which varies with temperature may create undesirable effects in application programs which are sensitive to timing variation, either with the same rank or different ranks.

SUMMARY

In accordance with the teachings of the present disclosure, the disadvantages and problems associated with optimizing memory performance in an information handling system may be reduced or eliminated.

In accordance with embodiments of the present disclosure, an information handling system may include a processor and a memory system communicatively coupled to the processor. The memory system may be configured to, alone or in concert with the processor determine a temperature associated with the memory system and determine if the temperature is below a minimum threshold temperature, wherein the minimum threshold temperature is a predetermined margin greater than a critical temperature below which one or more timing parameters of the memory system are of greater durations than they are when the temperature is above the critical temperature, and further wherein the predetermined margin is zero or greater. The memory system may further be configured to initiate one or more remedial actions to increase the temperature above the minimum threshold temperature if the temperature is below the minimum threshold temperature.

In accordance with these and other embodiments of the present disclosure, a method may include determining a temperature associated with a memory system. The method may also include determining if the temperature is below a minimum threshold temperature, wherein the minimum threshold temperature is a predetermined margin greater than a critical temperature below which one or more timing parameters of the memory system are of greater durations than they are when the temperature is above the critical temperature, and further wherein the predetermined margin is zero or greater. The method may additionally include initiating one or more remedial actions to increase the temperature above the minimum threshold temperature if the temperature is below the minimum threshold temperature.

In accordance with these and other embodiments of the present disclosure, a memory system may include one or more memory modules and a memory controller communicatively coupled to one or more memory modules. The memory controller may be configured to determine a temperature associated with the memory system and determine if the temperature is below a minimum threshold temperature, wherein the minimum threshold temperature is a predetermined margin greater than a critical temperature below which one or more timing parameters of the memory system are of greater durations than they are when the temperature is above the critical temperature, and further wherein the predetermined margin is zero or greater. The memory controller may also be configured to initiate one or more remedial actions to increase the temperature above the minimum threshold temperature if the temperature is below the minimum threshold temperature.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
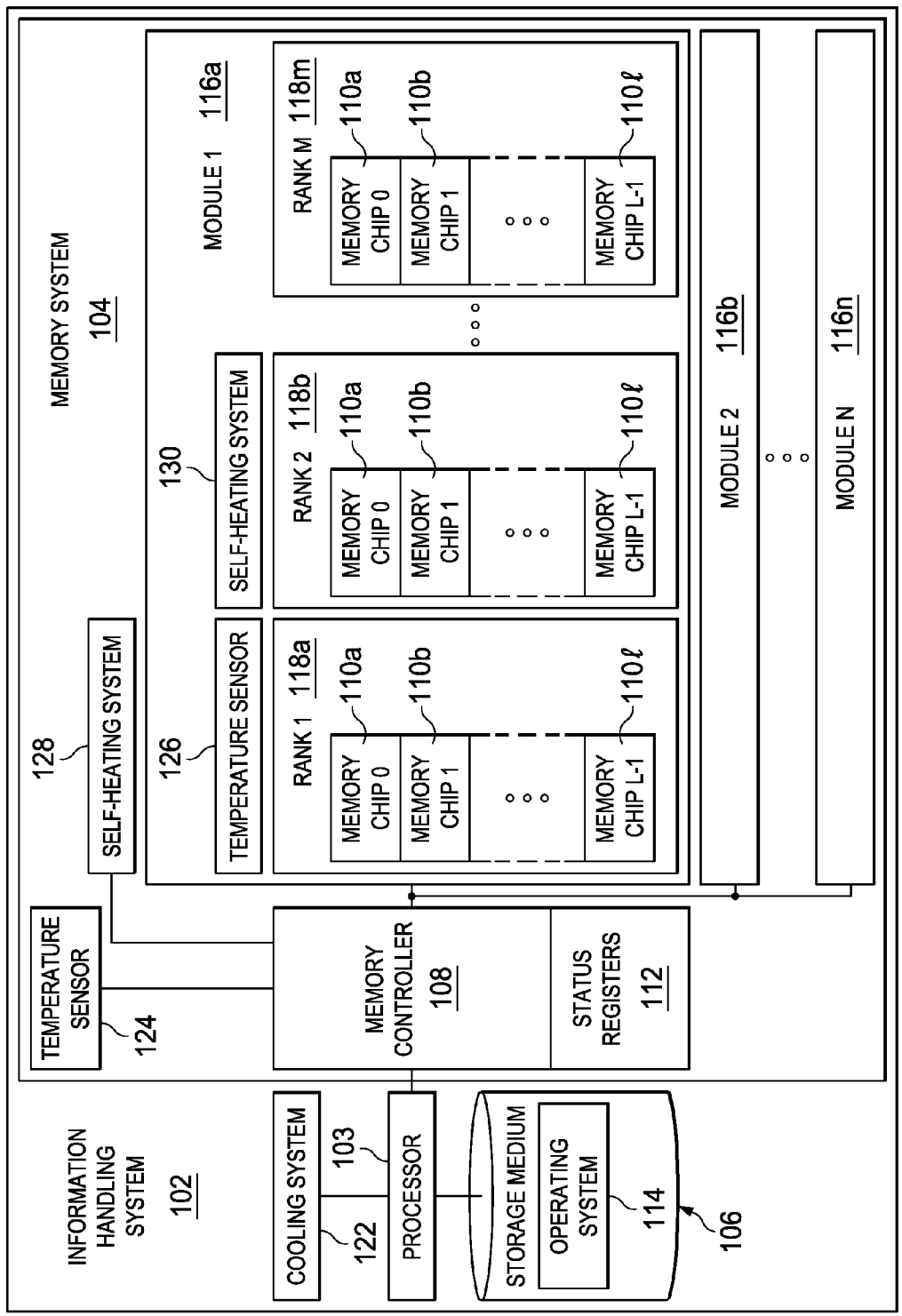
FIG. 1 illustrates a block diagram of an example information handling system in accordance with embodiments of the present disclosure.
Figure 2:
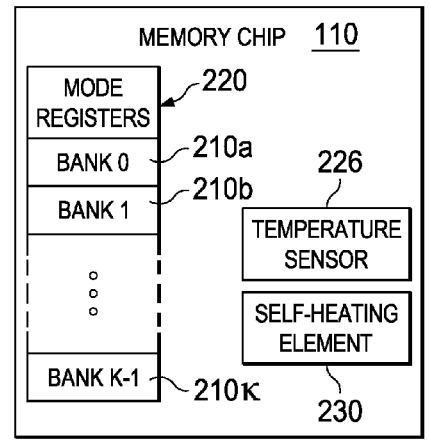
FIG. 2 illustrates a block diagram of an example memory chip in accordance with embodiments of the present disclosure.
Figure 3:
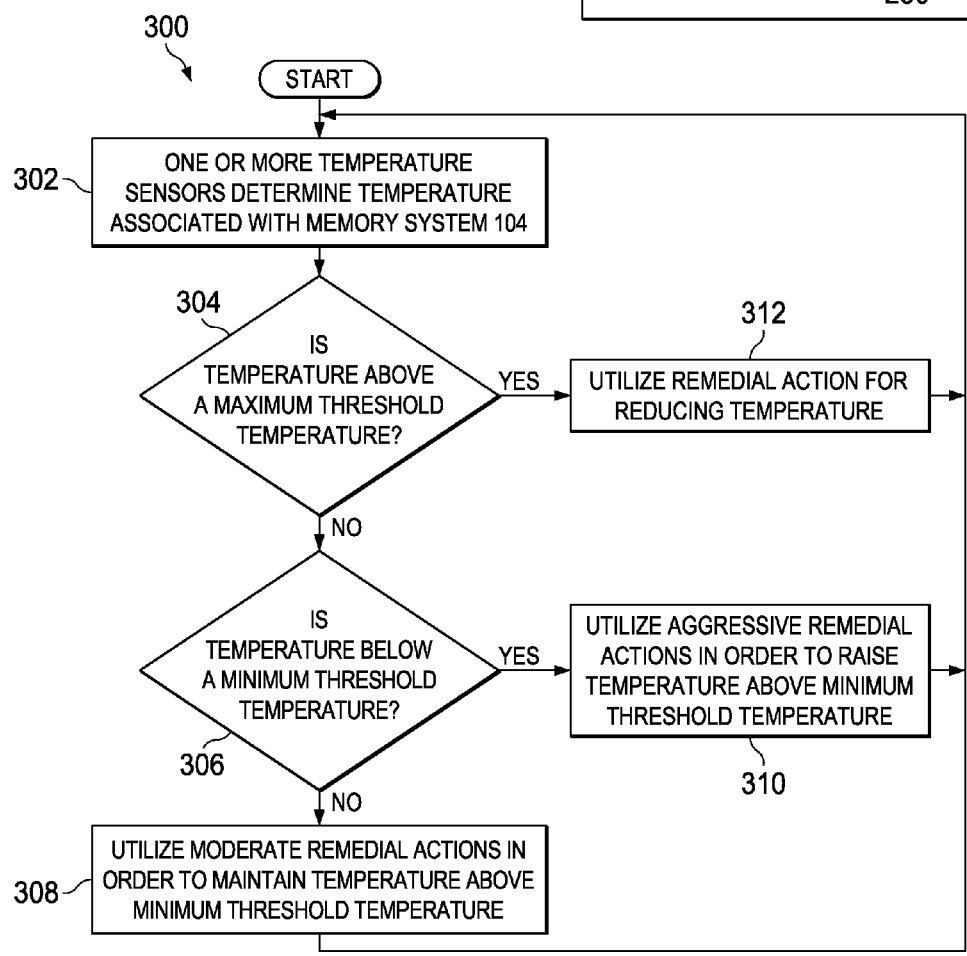
FIG. 3 illustrates a flow chart of an example method for temperature-based optimization for memory devices, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102 in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory system 104 communicatively coupled to processor 103, a storage medium 106 communicatively coupled to processor 103, and a cooling system 122 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, storage medium 106, and/or another component of information handling system 102.

Memory system 104 may be communicatively coupled to processor 103 and may comprise any system, device, or apparatus operable to retain program instructions or data for a period of time (e.g., computer-readable media). Memory system 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory system 104 may comprise dynamic random access memory (DRAM).

As shown in FIG. 1, memory system 104 may include memory controller 108, one or more memory modules 116a-116n communicatively coupled to memory controller 108, status registers 112 communicatively coupled to memory controller 108, a temperature sensor 124, and a self-heating system 128. Memory controller 108 may be any system, device, or apparatus configured to manage and/or control memory system 104. For example, memory controller 108 may be configured to read data from and/or write data to memory modules 116 comprising memory system 104. Additionally or alternatively, memory controller 108 may be configured to refresh memory modules 116 and/or memory chips 110 thereof in embodiments in which memory system 104 comprises DRAM. Although memory controller 108 is shown in FIG. 1 as an integral component of memory system 104, memory controller 108 may be separate from memory system 104 and/or may be an integral portion of another component of information handling system 102 (e.g., memory controller 108 may be integrated into processor 103).

Each memory module 116 may include any system, device or apparatus configured to retain program instructions and/or data for a period of time (e.g., computer-readable media). A memory module 116 may comprise a dual in-line package (DIP) memory, a dual-inline memory module (DIMM), a Single In-line Pin Package (SIPP) memory, a Single Inline Memory Module (SIMM), a Ball Grid Array (BGA), or any other suitable memory module.

As depicted in FIG. 1, each memory module 116 may include one or more ranks 118*a*-118*m*. Each memory rank 118 within a memory module 116 may be a block or area of data created using some or all of the memory capacity of the memory module 116. In some embodiments, each rank 118 may be a rank as such term in defined by the JEDEC Standard for memory devices.

As shown in FIG. 1, each rank 118 may include a plurality of memory chips 110. Each memory chip 110 may include a packaged integrated circuit configured to comprise a plurality of memory cells 110 for storing data. In some embodiments, a memory chip 110 may include dynamic random access memory (DRAM). Selected components of a memory chip 110 are illustrated in greater detail in FIG. 2 below.

As shown in FIG. 1, a memory module 116 may include a temperature sensor 126 and a self-heating system 130. Temperature sensor 126 may comprise any system, device, or apparatus (e.g., a thermometer, thermistor, etc.) configured to communicate a signal to memory controller 108 and/or control logic internal to the memory module 116 indicative of a temperature within memory module 116. In some embodiments, such temperature sensors 126 may already be required within a memory module 116 to provide thermal feedback to memory controller 108 or processor 103 to allow for closed-loop thermal management of memory module 116 and/or enable other thermal or power management features of a memory module 116.

Self-heating system 130 may comprise any system, device, or apparatus for generating heat and communicating such generated heat to components throughout a memory module 116 (e.g., to memory chips 110 integral to such memory module 116). For example, self-heating element 130 may comprise programmable heating elements (e.g., electrically resistive loads) under the control of memory controller 108, processor 103, logic internal to memory module 116, or another information handling resource of information handling system 102. In some embodiments, such control may be implemented as a closed-loop thermal control based on active monitoring of temperature sensor 126. In other embodiments, such control may be implemented as an open-loop thermal control (e.g., by passive monitoring of a memory module 116 and/or temperature of air ambient to such memory module 116). To communicate heat generated by such heating element to memory chips 110, self-heating system 130 may include one or more heat pipes, heat spreaders, or other thermally-conductive components coupling memory chips 110 to such heating element.

Status registers 112 may include one or more configuration variables and/or parameters associated with memory system 104. When reading, writing, refreshing, and/or performing other operations associated with memory system 104, memory controller 108 may carry out such operations based at least in part on configuration parameters and/or variables stored in status registers 112. In some embodiments, status registers 112 may include registers similar to mode registers 220.

Temperature sensor 124 may comprise any system, device, or apparatus (e.g., a thermometer, thermistor, etc.) configured to communicate a signal to memory controller 108 indicative of a temperature within memory system 104. In some embodiments, a temperature sensor 124 may detect a temperature associated with memory system 104 at large. In these and other embodiments, memory system 104 may comprise a plurality of temperature sensors 124, wherein each temperature sensor 124 may detect a temperature near a particular component and/or location within memory system 104. For example, where memory system 104 comprises memory modules 116 comprise DIMMs, one or more DIMMs may be monitored by a respective temperature sensor 124.

Self-heating system 128 may comprise any system, device, or apparatus for generating heat and communicating such generated heat to components (e.g., memory modules 116) of memory system 104. For example, self-heating system 128 may have one or more programmable heating elements (e.g., electrically resistive loads) under the control of memory controller 108, processor 103, or another information handling resource of information handling system 102. In some embodiments, such control may be implemented as a closed-loop thermal control based on active monitoring of temperature sensor 124. In other embodiments, such control may be implemented as an open-loop thermal control (e.g., by passive monitoring of memory system 104 and/or temperature of air ambient to memory system 104). To communicate heat generated by such heating element to memory modules 116, self-heating system 128 may include one or more heat pipes, heat spreaders, or other thermally-conductive components coupling memory modules 116 to such heating element.

Storage medium 106 may be communicatively coupled to processor 104. Storage medium 106 may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114. OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

Cooling system 122 may include any mechanical or electro-mechanical system, apparatus, or device operable to move coolant (e.g., air, other gasses, liquids) throughout a chassis or enclosure of information handling system 102. In some embodiments, cooling system 122 may comprise a fan (e.g., a rotating arrangement of vanes or blades which act on a gaseous coolant such as air). In other embodiments, cooling system 122 may comprise a blower (e.g., a centrifugal fan that employs rotating impellers to accelerate gaseous cooling received at its intake and change the direction of the airflow). In operation, in the case of a cooling system 122 including an air mover (e.g., fan or blower), the air mover may cool information handling resources of information handling system 102 by drawing cool air into an enclosure housing the information handling resources from the outside of the housing, expel warm air from inside the enclosure to the outside of such enclosure, and/or move air across one or more heatsinks (not explicitly shown) internal to the enclosure to cool one or more information handling resources. Although not explicitly depicted in FIG. 1, cooling system 122 may also include one or more heating elements in air flow paths which may be enabled to pre-heat air before it is delivered to an information handling resource (e.g., memory system 104 or a portion thereof) in order to provide heat to such information handling resource. In these and other embodiments, cooling system 122 may include one or more air deflection structures, such as, for example, static or dynamically adjustable air ducts and/or plenums, to steer air flow towards or away from particular information handling resources as desired. Parameters for controlling air flow (e.g., air mover speed, positions of air deflection structures, etc.) and/or heat of air (e.g., heating elements within the air flow) may be managed and controlled by a thermal management system of cooling system 122.

In other embodiments, cooling system 122 may comprise mechanisms other than a blower for moving coolant, including liquid pumps, jets, and/or free convection enclosures. In these and other embodiments, rotating and other components for moving coolant by cooling system 122 may be driven by a motor or other mechanical device.

In addition to processor 103, memory 104, storage medium 106, and cooling system 122, information handling system 102 may include one or more other information handling resources.

FIG. 2 illustrates a block diagram of an example memory chip in accordance with embodiments of the present disclosure. A memory chip 110 may include mode registers 220 and one or more memory banks 210. Each memory bank 210 may be a logical unit of storage within memory chip 110.

Mode registers 220 may include one or more configuration variables and/or parameters associated with memory chip 110. When reading, writing, refreshing, and/or performing other operations associated with memory system 104, a memory module 116 may carry out such operations based at least in part on configuration parameters and/or variables stored in mode registers 220. In some embodiments, mode registers 220 may be defined by a JEDEC standard for memory devices.

As shown in FIG. 2, a memory chip 110 may include a temperature sensor 226 and a self-heating element 230. Temperature sensor 226 may comprise any system, device, or apparatus (e.g., a thermometer, thermistor, etc.) configured to communicate a signal to memory controller 108 and/or control logic internal to the memory chip 110 indicative of a temperature within the memory chip 110. In some embodiments, such temperature sensors 226 may already be required within a memory chip 110 to implement temperature compensated self-refresh rate features and/or other features of a memory chip 110.

Self-heating element 130 may comprise any system, device, or apparatus for generating heat and communicating such generated heat throughout a memory chip 110 (e.g., throughout an integrated circuit die comprising such memory chip 110). For example, self-heating element 230 may comprise a programmable heating elements (e.g., electrically resistive loads) under the control of memory controller 108, processor 103, logic internal to memory module 116, logic internal to memory chip 110, or another information handling resource of information handling system 102.

In some embodiments, such control may be implemented as a closed-loop thermal control based on active monitoring of temperature sensor 226. In some embodiments, mode registers 220 may be employed to store parameters such that memory controller 108, processor 103, logic internal to memory module 116, logic internal to memory chip 110, or another information handling resource of information handling system 102 may control self-heating elements 230 on a memory chip 110-by-memory chip 110 basis.

In operation, one or more of cooling system 122 and memory system 104 is configured to regulate a temperature associated with memory system 104 (e.g., one or more temperatures detected by one or more of temperature sensor 124, temperature sensors 126, and/or temperature sensors 226) in order to optimize timing parameters of memory system 104. For example, as a temperature associated with memory system 104 cools down towards a temperature threshold whereby memory system 104 would switch to lower-performance memory timing parameters (e.g., an increased write recovery parameter for all or a portion of memory system 104), one or more of cooling system 122 and memory system 104 would take one or more remedial actions to maintain the temperature associated with memory system 104 to remain above the temperature threshold. Such remedial actions may include, without limitation:

reducing air flow from cooling system 122 to all or a part of memory system 104 (e.g., reducing air flow to memory modules 116 having higher temperatures);

increasing air temperature of air flow of cooling system 122 to all or a part of memory system 104 (e.g., activating heating elements of cooling system 122 within the air flow path of memory modules 116 having higher temperatures);

activating self-heating system 128 to maintain or increase a temperature associated with memory system 104 (e.g., a temperature sensed by temperature sensor 124);

activating a self-heating system 130 of a memory module 116 to maintain or increase a temperature associated with memory system 104 (e.g., a temperature sensed by temperature sensor 126 of such memory module 116); and activating a self-heating element 230 of a memory chip 110 to maintain or increase a temperature associated with memory system 104 (e.g., a temperature sensed by temperature sensor 226 of such memory chip 110); and issuance within a memory chip 110 of an internal non-destructive memory cycle or "dummy cycle" to consume power and thus increase or maintain temperature within the memory chip 110.

In the case of issuance of an internal non-destructive memory cycle, a memory chip 110 may execute such a memory cycle when it is not activated to maintain or increase a temperature. Such cycle may include an activate, precharge, read, refresh, or any other non-destructive memory cycle that will complete before the memory chip 110 must be ready to accept a new memory command. For example, so as to always be ready to accept memory commands from processor 103, the dummy cycles would be issued to internal ranks 118 or banks 210 coherently with "real" memory cycles in order to ensure that the dummy cycles do not collude with the real cycles.

In some embodiments, a memory chip 110 may maintain a suite of dummy command cycles each with a known activation energy through table, characterization, measurement or other means. The memory module 116 may then choose the optimal dummy command cycle that best provides the optimal amount of power (heat) dissipation. For example, when a temperature associated with a memory module 116 is near the lower bound of a temperature threshold, dummy cycles with higher power may be utilized, whereas when the temperature is higher, dummy cycles with less power dissipation would be chosen.

In these and other embodiments, a memory module 116 may also queue up of a range of "dummy" command cycles to multiple ranks 118, banks 210, sub-banks, etc. so that when an opportunistic dummy command slot is available, one or more cycles may be run in parallel.

In these and other embodiments, a memory module 116 may also make available to processor 103 readings from temperature sensor 126 and/or temperature sensor 226 (e.g., via the Multi-Purpose Register (MPR) read method, an out of band method such as System Management Bus or Inter-Integrated Circuit, or an in-band double data rate command response method), and thus also report (e.g., to a management tool of operating system 114) any number of statistics on how often self-heating system 128, self-heating system 130, and/or self-heating elements 230 have been enabled within a certain period of time. These statistics could be used advantageously in a higher-level thermal management algorithm to maximize overall system performance and power, by adjusting and/or combining the amount of memory module 116 self-heating with other heating options described below.

In some embodiments, a memory module may suspend self-heating while in specific low-power power management modes such as self-refresh, or clock enable (CKE) power down. Various tradeoffs between power and performance may be made available to processor 103, memory controller 108, or another component of information handling system 102 by employing programmable MPRs.

In some embodiments, a memory module 116 may self-throttle the self-heating command cycles and/or resistive load elements to ensure that the operating currents of the various memory modules 116 do not exceed system current limits.

FIG. 3 illustrates a flow chart of an example method 300 for temperature-based optimization for memory devices, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, one or more temperature sensors (e.g., temperature sensors 124, 126, and/or 226) may determine a temperature associated with memory system 104 and communicate such temperature to a processing device (e.g., memory controller 108, processor 103, logic internal to a memory module 116, logic internal to a memory chip 110). At step 304, the processing device may determine if whether the temperature is above a maximum threshold temperature. Such maximum threshold temperature may define a maximum temperature at which memory system 104 or a component thereof may operate at a desired or optimum level of performance. If the measured temperature exceeds the maximum threshold temperature, method 300 may proceed to step 312. Otherwise, method 300 may proceed to step 306.

At step 306, the processing device may determine whether the measured temperature is below a minimum threshold temperature. Such minimum threshold temperature may define a minimum temperature (or such minimum temperature plus a "safety" margin above such minimum temperature) for which timing parameters (e.g., a write recovery parameter) of memory system 104 or its components may have optimum values, wherein at temperatures below the minimum threshold temperature, such timing parameters may be suboptimal. If the measured temperature is above the minimum threshold temperature, method 300 may proceed to step 308. Otherwise, method 300 may proceed to step 310.

At step 308, in response to determining that the measured temperature is above the minimum threshold temperature, memory system 104, alone or in concert with the processing device, may utilize moderate remedial actions in order to maintain the temperature associated with memory system 104 above the minimum threshold temperature. For example, such remedial action may include issuing non-destructive dummy commands to ranks 118 and/or banks 210 of memory system 104. After completion of step 308, method 300 may proceed again to step 302.

At step 310, in response to determining that the measured temperature is below the minimum threshold temperature, memory system 104, alone or in concert with the processing device, may utilize aggressive remedial actions in order to raise the temperature associated with memory system 104 above the minimum threshold temperature. For example, such remedial action may include activating self-heating system 128, self-heating system 130, and/or self-heating elements 230. After completion of step 308, method 300 may proceed again to step 302.

At step 312, in response to determining that the measured temperature is above the maximum threshold temperature, remedial action may be taken to reduce the temperature associated with memory system 104. For example, such remedial action may include increasing airflow or cooling via cooling system 122 and/or disabling or reducing the heat generated by heating systems 128, 130, and 230. After completion of step 308, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using processor 103, memory controller 108, and/or any other system operable to implement method 300. In certain embodiments, method 300 may be implemented partially or fully in software and/or firmware embodied in computer-readable media.

Thus, consistent with the methods and systems disclosed herein, a memory system may be configured to, alone or in concert with a processor to which it is coupled, determine a temperature associated with the memory system and determine if the temperature is below a minimum threshold temperature, wherein the minimum threshold temperature is a predetermined margin greater than a critical temperature below which one or more timing parameters of the memory system are of greater durations than they are when the temperature is above the critical temperature, and further wherein the predetermined margin is zero or greater. If the temperature is below the minimum threshold temperature, memory system 104 may alone or in concert with the processor, initiate one or more remedial actions to increase the temperature above the minimum threshold temperature.

In addition, in some embodiments, the memory system may be further configured to, alone or in combination with the processor, determine if the temperature is above the minimum threshold temperature and below a maximum threshold temperature, and if the temperature is above the minimum threshold temperature and below a maximum threshold temperature, initiate one or more remedial actions to maintain the temperature above the minimum threshold temperature.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a memory system communicatively coupled to the processor, the memory system configured to, alone or in concert with the processor:
   determine a temperature associated with the memory system;
   determine if the temperature is below a minimum threshold temperature, wherein the minimum threshold temperature is a predetermined margin greater than a critical temperature below which one or more timing parameters of the memory system are of greater durations than the one or more timing parameters are when the temperature is above the critical temperature, and further wherein the predetermined margin is zero or greater; and
   if the temperature is below the minimum threshold temperature, initiate one or more remedial actions to increase the temperature above the minimum threshold temperature;
   wherein:
   the one or more remedial actions comprises issuing a non-destructive dummy cycle to consume power within a memory module of the memory system; and
   the non-destructive dummy cycle is selected from a plurality of dummy cycles each having a known activation energy in order to provide an optimal amount of power dissipation based on the temperature.

2. The information handling system of claim 1, the memory system further configured to, alone or in combination with the processor:
   determine if the temperature is above the minimum threshold temperature and below a maximum threshold temperature; and
   if the temperature is above the minimum threshold temperature and below a maximum threshold temperature, initiate one or more remedial actions to maintain the temperature above the minimum threshold temperature.

3. The information handling system of claim 1, wherein the one or more remedial actions comprise reducing air flow from a cooling system for cooling the memory system to at least a portion of the memory system.

4. The information handling system of claim 1, wherein the one or more remedial actions comprise increasing an air temperature of air flow of a cooling system for cooling the memory system to at least a portion of the memory system.

5. The information handling system of claim 1, wherein the one or more remedial actions comprise activating a self-heating system of the memory system to generate and communicate heat to one or more components of the memory system.

6. The information handling system of claim 1, wherein the one or more remedial actions comprise activating a self-heating element of a memory chip of the memory system.

7. A method comprising:
   determining a temperature associated with a memory system;
   determining if the temperature is below a minimum threshold temperature, wherein the minimum threshold temperature is a predetermined margin greater than a critical temperature below which one or more timing parameters of the memory system are of greater durations than the one or more timing parameters are when the temperature is above the critical temperature, and further wherein the predetermined margin is zero or greater; and
   if the temperature is below the minimum threshold temperature, initiating one or more remedial actions to increase the temperature above the minimum threshold temperature;
   wherein:
   the one or more remedial actions comprises issuing a non-destructive dummy cycle to consume power within a memory module of the memory system; and
   the non-destructive dummy cycle is selected from a plurality of dummy cycles each having a known activation energy in order to provide an optimal amount of power dissipation based on the temperature.

8. The method of claim 7, further comprising:
   determining if the temperature is above the minimum threshold temperature and below a maximum threshold temperature; and
   if the temperature is above the minimum threshold temperature and below a maximum threshold temperature, initiating one or more remedial actions to maintain the temperature above the minimum threshold temperature.

9. The method of claim 7, wherein the one or more remedial actions comprise reducing air flow from a cooling system for cooling the memory system to at least a portion of the memory system.

10. The method of claim 7, wherein the one or more remedial actions comprise increasing an air temperature of air flow of a cooling system for cooling the memory system to at least a portion of the memory system.

11. The method of claim 7, wherein the one or more remedial actions comprise activating a self-heating system of the memory system to generate and communicate heat to one or more components of the memory system.

12. The method of claim 7, wherein the one or more remedial actions comprise activating a self-heating element of a memory chip of the memory system.

13. A memory system, comprising:
one or more memory modules; and
a memory controller communicatively coupled to one or more memory modules and configured to:
determine a temperature associated with the memory system;
determine if the temperature is below a minimum threshold temperature, wherein the minimum threshold temperature is a predetermined margin greater than a critical temperature below which one or more timing parameters of the memory system are of greater durations than the one or more timing parameters are when the temperature is above the critical temperature, and further wherein the predetermined margin is zero or greater; and
if the temperature is below the minimum threshold temperature, initiate one or more remedial actions to increase the temperature above the minimum threshold temperature;
wherein:
the one or more remedial actions comprises issuing a non-destructive dummy cycle to consume power within a memory module of the memory system; and
the non-destructive dummy cycle is selected from a plurality of dummy cycles each having a known activation energy in order to provide an optimal amount of power dissipation based on the temperature.

14. The memory system of claim 13, the memory controller further configured to:
determine if the temperature is above the minimum threshold temperature and below a maximum threshold temperature; and
if the temperature is above the minimum threshold temperature and below a maximum threshold temperature, initiate one or more remedial actions to maintain the temperature above the minimum threshold temperature.

15. The memory system of claim 13, wherein the one or more remedial actions comprise reducing air flow from a cooling system for cooling the memory system to at least a portion of the memory system.

16. The memory system of claim 13, wherein the one or more remedial actions comprise increasing an air temperature of air flow of a cooling system for cooling the memory system to at least a portion of the memory system.

17. The memory system of claim 13, wherein the one or more remedial actions comprise activating a self-heating system of the memory system to generate and communicate heat to the one or more memory modules.

18. The memory system of claim 13, wherein the one or more remedial actions comprise activating a self-heating element of at least one of the one or more memory chips of the memory system.

* * * * *